US007918473B2

(12) United States Patent
Yao

(10) Patent No.: US 7,918,473 B2
(45) Date of Patent: Apr. 5, 2011

(54) STRUCTURE OF WHEELCHAIR THAT IS CONVERTIBLE INTO PUSH-COT

(76) Inventor: Meei-Huei Yao, Caotun Township, Nantou County (TW)

( * ) Notice: Subject to any disclaimer, the term of this patent is extended or adjusted under 35 U.S.C. 154(b) by 557 days.

(21) Appl. No.: 12/003,165

(22) Filed: Dec. 20, 2007

(65) Prior Publication Data

US 2009/0160158 A1 Jun. 25, 2009

(51) Int. Cl.

| | |
|---|---|
| ***A61G 5/02*** | (2006.01) |
| ***B62B 7/10*** | (2006.01) |
| ***B62B 9/12*** | (2006.01) |

(52) U.S. Cl. .......................................... 280/287; 280/657

(58) Field of Classification Search .................... 280/30, 280/287, 288.3, 304.1, 640, 642, 643, 647, 280/648, 650, 657, 47.4; 297/DIG. 4, 16, 297/19, 29, 30, 243, 244, 245, 233, 234, 297/236, 257; 5/600, 618, 619, 81, 1

See application file for complete search history.

(56) References Cited

U.S. PATENT DOCUMENTS

| | | | | |
|---|---|---|---|---|
| 3,719,390 | A * | 3/1973 | Haney | 297/6 |
| 4,773,494 | A * | 9/1988 | Anderson | 180/6.48 |
| 4,813,693 | A * | 3/1989 | Lockard et al. | 280/42 |
| 4,989,890 | A * | 2/1991 | Lockard et al. | 280/42 |
| 5,294,141 | A * | 3/1994 | Mentessi et al. | 280/250.1 |
| 5,419,571 | A * | 5/1995 | Vaughan | 280/250.1 |
| 7,384,058 | B2 * | 6/2008 | Munsey et al. | 280/642 |
| 7,500,689 | B2 * | 3/2009 | Pasternak et al. | 280/304.1 |
| 2003/0189317 | A1 * | 10/2003 | Chen et al. | 280/650 |

* cited by examiner

*Primary Examiner* — J. Allen Shriver, III
*Assistant Examiner* — Bridget Avery
(74) *Attorney, Agent, or Firm* — Muncy, Geissler, Olds & Lowe, PLLC

(57) ABSTRACT

A wheelchair is constructed to be convertible into a push-cot. The wheelchair includes a main chassis and front and rear chassis that are removably received in the main chassis and are extendable in frontward and rearward directions. A reclining back frame is rotatably mounted to the rear side of the main chassis and is in driving coupling with the rear chassis so that when the rear chassis is extended, the reclining back frame is moved from a substantially upright position to a horizontal position to convert the wheelchair to a push-cot.

10 Claims, 11 Drawing Sheets

STRUCTURE OF WHEELCHAIR THAT IS CONVERTIBLE INTO PUSH-COT

BACKGROUND OF THE INVENTION

1. Field of the Invention

The present invention relates to a wheelchair that is convertible into a push-cot in order to allow a user to change from a sitting posture to a lying posture for allowing efficient and emergent medical treatment.

2. The Related Arts

A wheelchair is an importation transportation measure for disabled persons and old/weak persons to help them to move. The wheelchair is of substantially size and weight and thus needs to be operated by a companion who has to stay with the user of the wheelchair in order to ensure timely care of the wheelchair user. When not in use, the wheelchair occupies quite an amount of space and this is simply a waste of the space.

In addition, besides, the disabled persons, the wheelchair is also helpful to very sick persons who need to take short distance movement for example within a hospital. Such a very sick person, due to physical weakness, is very difficult to move between the wheelchair and a sickbed. Once an emergent situation happens while the patient is sitting on the wheelchair, it would takes the companion and nursing persons a lot of time and effort to move the patient from the wheelchair back to the sickbed. Such a waste of time may delay the emergent treatment that the patient needs. Although under certain circumstances, the patient may be put on the ground for carrying out the emergent treatment, it is not always feasible for the ground or floor may be full of contaminants or obstacles that prevent medical personnel from properly carrying out the treatment.

It is thus desired to provide a wheelchair that is efficiently convertible into a push-cot that allows the emergent medical treatment to be efficiently and properly carried out.

SUMMARY OF THE INVENTION

Thus, present invention is aimed to solve the problems that the wheelchair, although being an effective and user transportation measure for disabled/old/weak persons, as well as sick persons, takes quite an amount of space when not in use and moving a very sick patient between the wheelchair and a sickbed is a time- and labor-consuming job, which may cause undesired delay of emergent treatment to the patient.

An objective of the present invention is to provide a wheelchair, which is efficiently convertible into a push-cot without moving a patient sitting thereof in order to allow the medical persons to carry out immediate medical treatment in an emergency condition.

Another objective of the present invention is to provide a wheelchair that can be converted into a bed to allow a user of the wheelchair to lie down for more relaxed rest without moving between the wheelchair and a sickbed.

A further objective of the present invention is to provide a wheelchair that can be converted into a bed to allow a companion who takes care of the wheelchair user to take a rest thereon so that a not-in-use wheelchair does not uselessly occupy additional space.

A further objective of the present invention is to provide a wheelchair having an inclination-adjustable back.

In accordance with the present invention, a wheelchair is constructed to be convertible into a push-cot. The wheelchair comprises a main chassis and front and rear chassis that are removably received in the main chassis and are extendable in frontward and rearward directions. A reclining back frame is rotatably mounted to the rear side of the main chassis and is in driving coupling with the rear chassis so that when the rear chassis is extended, the reclining back frame is moved from a substantially upright position to a horizontal position to convert the wheelchair to a push-cot.

As compared to the regular wheelchairs, the wheelchair of the present invention has the advantages of (1) being efficiently convertible into a push-cot to allow for the performance of immediate and emergent medical treatment for a patient sitting on the wheel chair, (2) being convertible into a push-cot to allow a wheelchair user to lie down for more relaxed rest without moving between the wheelchair and a sickbed, and (3) being convertible into a bed to allow a companion who takes care of the wheelchair user to lie thereon for taking a rest. Further, the back of the wheelchair in accordance with the present invention can be selectively set at different inclination to provide the user with a desired posture.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
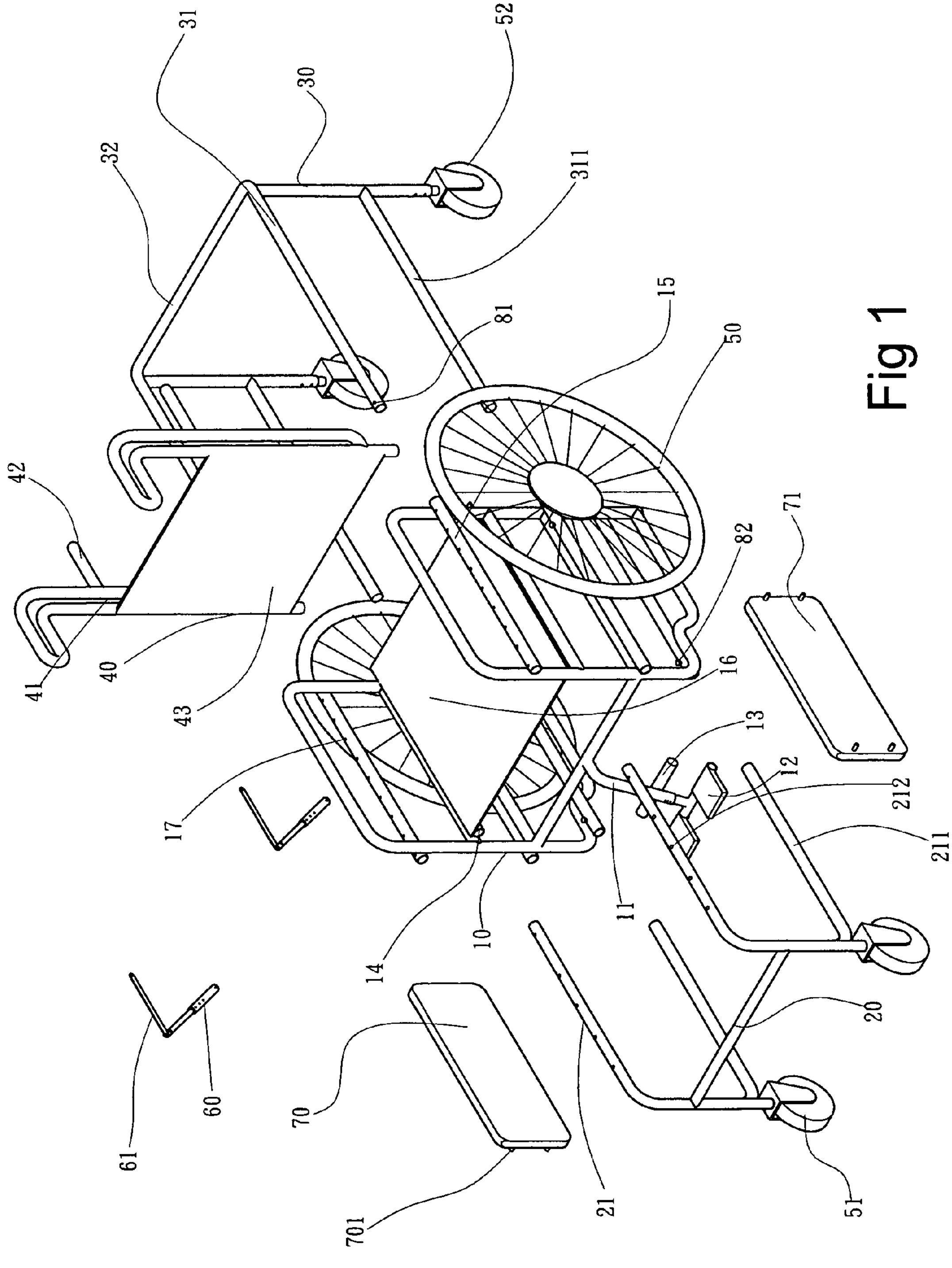
FIG. 1 is an exploded view of a wheelchair constructed in accordance with the present invention.
Figure 2:
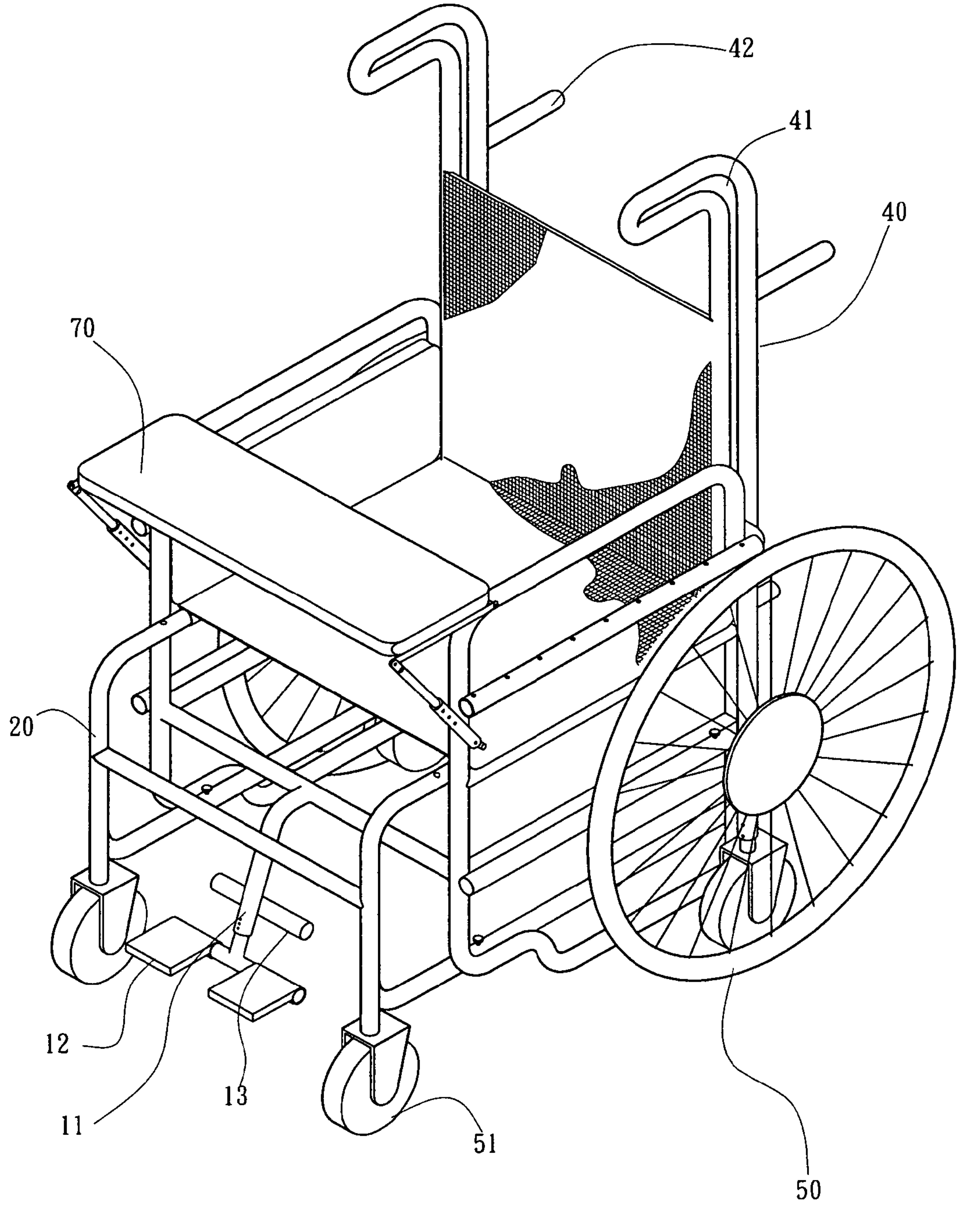
FIG. 2 is a perspective view of the wheelchair of the present invention.

With reference to the drawings and in particular to FIGS. 1 and 2, which are perspective views, respectively in exploded form and assembled form, of a wheelchair constructed in accordance the present invention, the wheelchair of the present invention is constructed to be convertible into a push-cot. In accordance with the present invention, the wheelchair comprises a main chassis 10 on which a seat upholstery 16 is provided. The main chassis 10 comprises a plurality of front and rear fitting tubes 14, 15, which are substantially horizontal in a normal condition of use of the wheelchair. Two large wheels 50 are rotatably mounted to two sides of the main chassis 10. The main chassis 10 has a front side and an opposite rear side. A hanger bracket 11 is fixed to the front side of the main chassis 10 to support thereon two footrests 12. A crossbar 13, which is substantially parallel to the footrests 12, is mounted to the hanger bracket 11 and above the footrests 12.

A front chassis 20 comprises upper-side and lower-side front extension tubes 21, 211 that are substantially horizontal. The front extension tubes 21, 211 are fit to the front fitting tubes 14 of the main chassis 10 and are telescopically movable with respect to each other for adjustment of relative position between the main chassis 10 and the front chassis 20 and are releasably fixable to each other to set a desired relative position. The front chassis 20 comprises front wheels 51 mounted to a bottom thereof.

A rotatable reclining back frame 40 has a lower end rotatably mounted to the rear side of the main chassis 10. The reclining back frame 40 has side frame members each forming a driving slot 41, which is preferably elongated. Handles 42 are mounted to the side frame members of the back frame 40.

Figure 6:
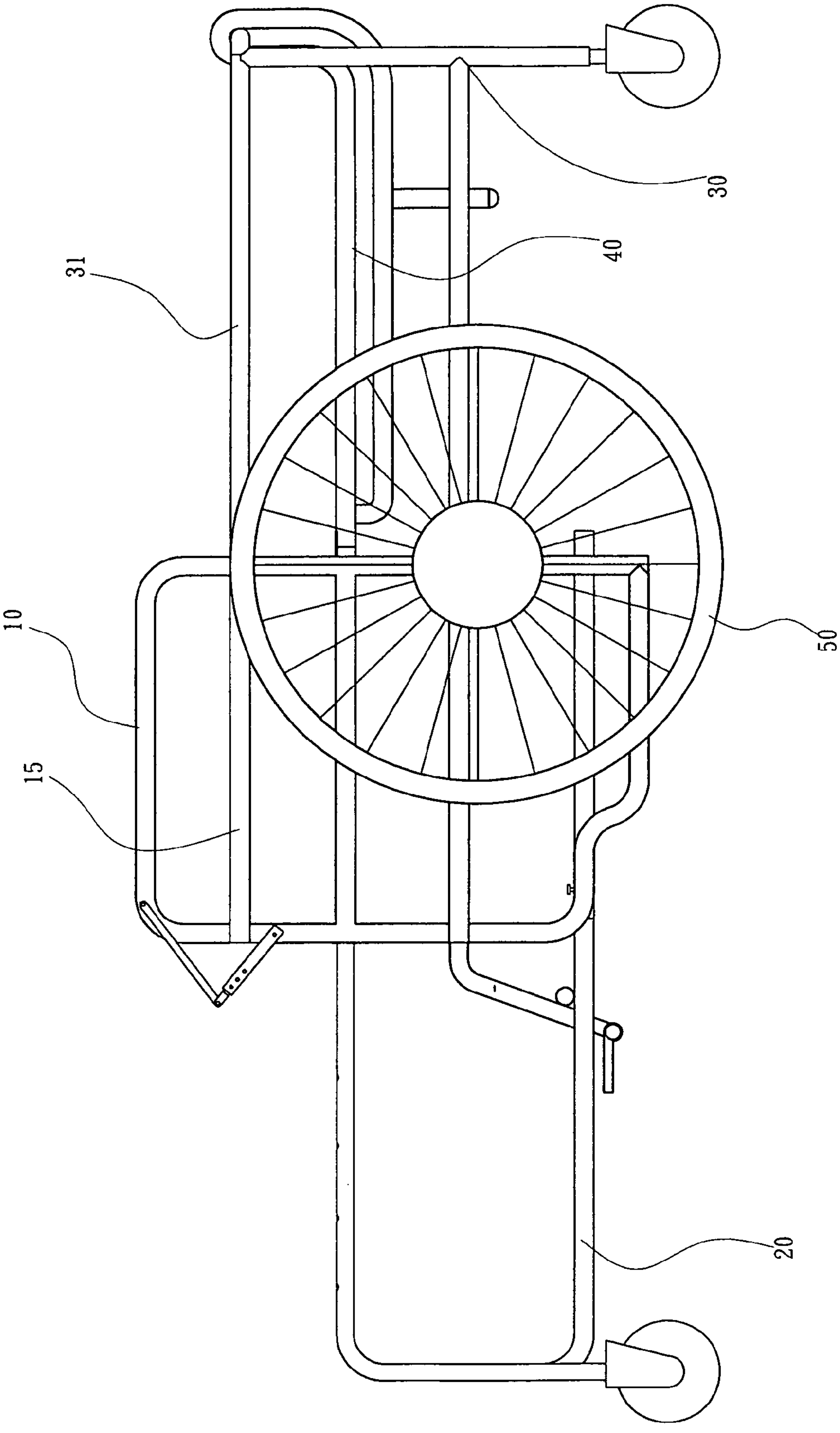
FIG. 6 is a side elevational view of the push-cot that is converted from the wheelchair of the present invention.
Figure 7:
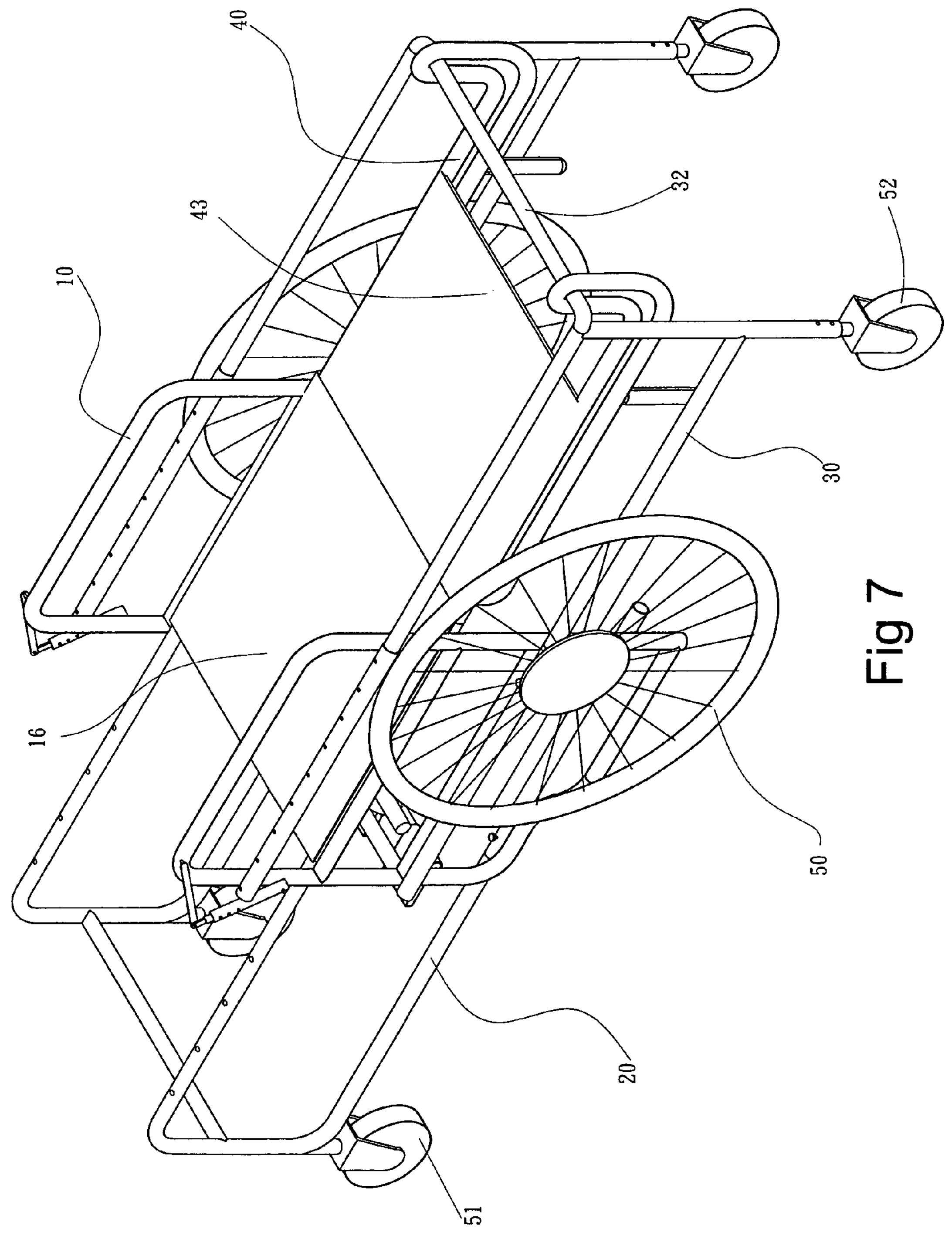
FIG. 7 is a perspective view illustrating that push-cot that is converted from the wheelchair of the present invention.
Figure 8:
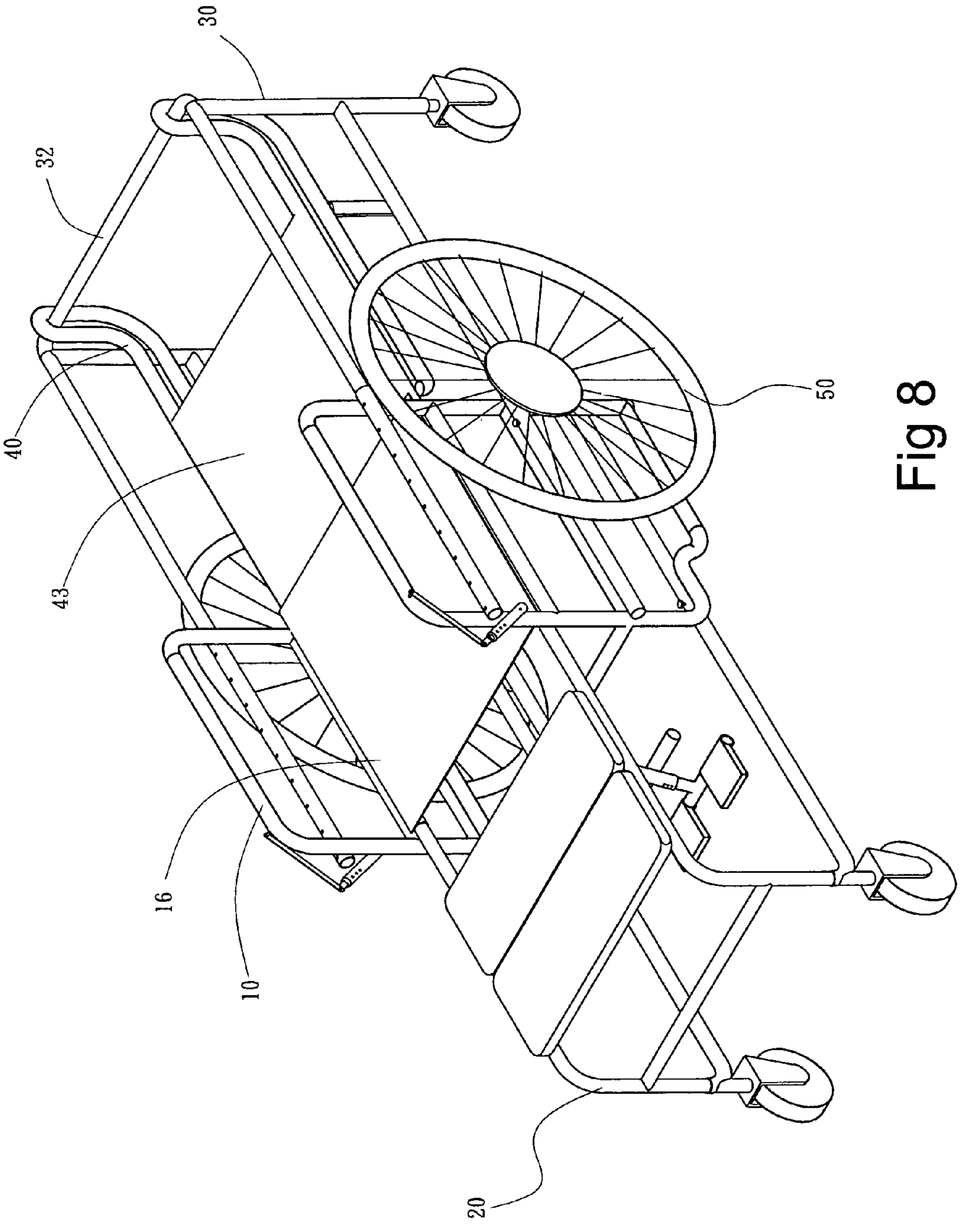
FIG. 8 is another perspective view of the push-cot that is converted from the wheelchair of the present invention.
Figure 9:
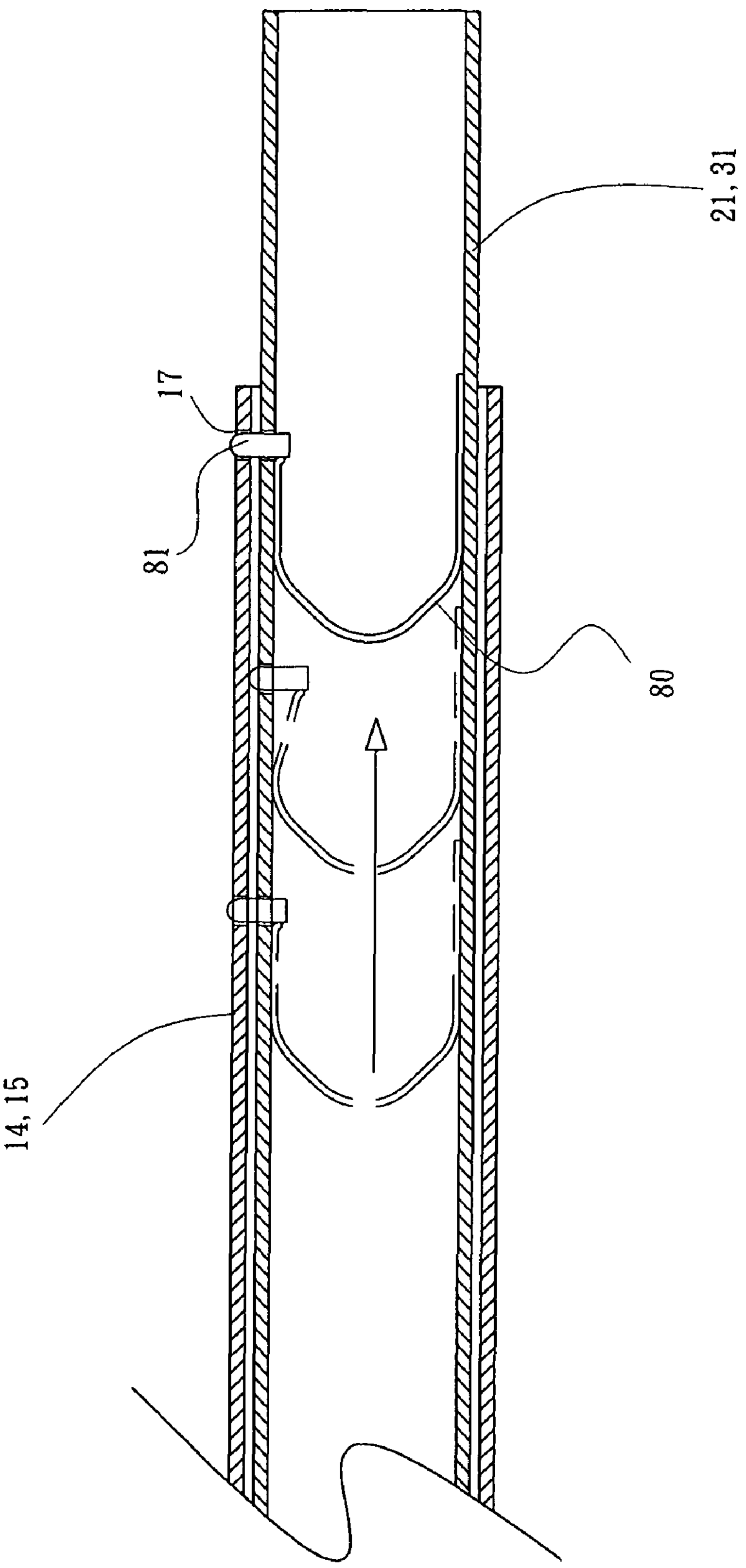
FIG. 9 is a cross-sectional view illustrating a releasable locking mechanism adopted in the wheelchair of the present invention.
Figure 10:
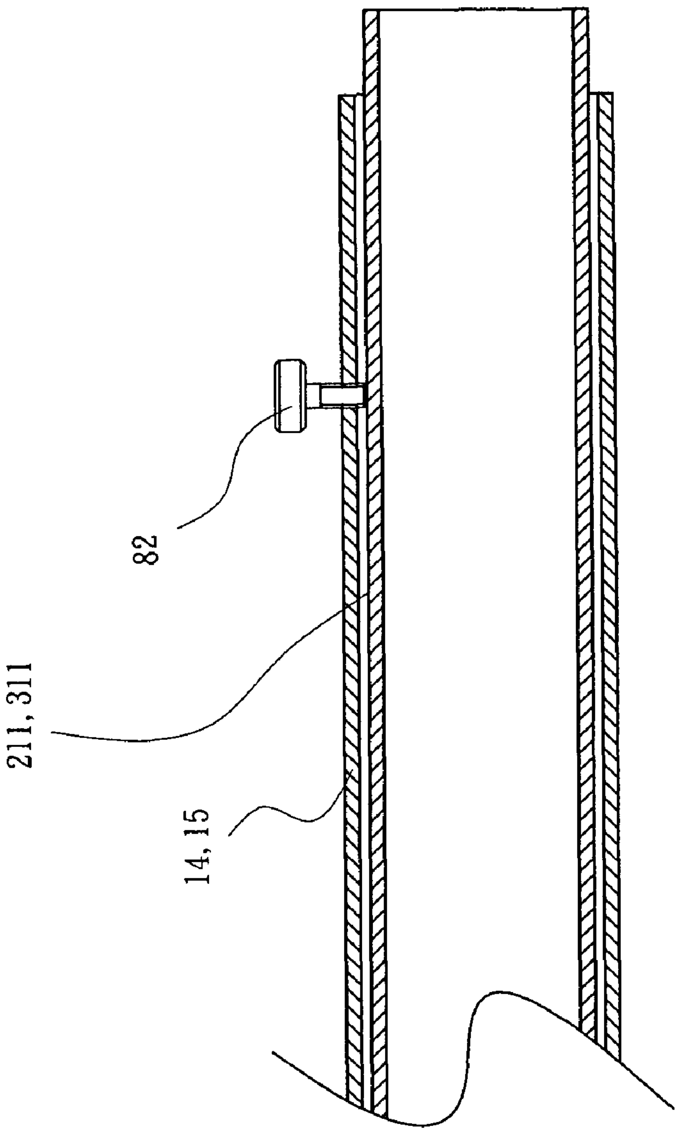
FIG. 10 is a cross-sectional view illustrating another releasable locking mechanism adopted in the wheelchair of the present invention.

A rear chassis 30 comprises upper-side and lower-side rear extension tubes 31, 311 that are substantially horizontal. The rear extension tubes 31, 311 are fit to the rear fitting tubes 15 of the main chassis 10 and are telescopically movable with respect to each other for adjustment of relative position between the main chassis 10 and the rear chassis 30 and are releasably fixable to each other to set a desired relative position. The rear chassis 30 comprises rear wheels 52 mounted to a bottom thereof. The rear chassis 30 also comprises a driving bar 32 extending between the upper-side rear extension tubes 31 and movably extending through both driving slots 41 of the reclining back frame 40. When the rear chassis 30 is moved to change the relative position thereof with respect to the main chassis 10, the driving bar 32 applies a force to the driving slots 41 to thereby drive the reclining back frame 40 to change inclination angle thereof. In the embodiment illustrated, the side frame members of the reclining back frame 40 are L-shaped, having a free end section substantially perpendicular thereto. Correspondingly, the driving slot 41 formed along the side frame member of the reclining back frame 40 is also of an L-shaped so that when the reclining back frame 40 is set in a horizontal condition, the driving bar 32 of the rear chassis 30 is located in the free end sections of the reclining back frame 40, as shown in FIGS. 6-8.

Side guard boards 70, 71 are mounted to the main chassis 10 in such a way that when the structure of the present invention is set in a "wheelchair" condition, the side guard boards 70, 71 are mounted below armrests (not labeled) of the main chassis 10. At least one of the side guard boards 70, 71 is removable or movable to be substantially horizontal and located in front of the armrests of the main chassis 10 to serve as a dinning table or a desk for writing. In the embodiment illustrated, this is done by stretching and rotating extendible bars 60 rotatably mounted to the two sides of the main chassis 10 and support arms 61 rotatably and respectively connected to the extendible bars 60 and the main chassis 10. The side guard board 70 that is convertible into a dinning table is retained on the support arms 60. When the wheelchair is converted into a push-cot, the guard boards 70, 71 are detached from the main chassis 10 and re-positioned on the front chassis 20 that has been extended from the main chassis 10 by having pegs 701 formed on the guard boards 70, 71 fit into holes 212 defined in the upper-side front extension tubes 21 of the front chassis 20 so that the guard boards 70, 71 straddle between the upper-side front extension tubes 21 to serve as a leg support to a patient lying on the push-cot.

To summarize, the main chassis 10 has front and rear sides to which the front and rear chassis 20, 30 are respectively and movably attached by having the upper-side and lower-side front extension tubes 21, 221 of the front chassis 20 and the upper-side and lower-side rear extension tubes 31, 311 of the rear chassis 30 respectively and telescopically fit to the front and rear fitting tubes 14, 15 of the main chassis 10. A rotatably reclining back frame 40 is rotatably attached to the rear side of the main chassis 10. A hanger bracket 11 is mounted to and extends from the front side of the main chassis 10 to support the footrests 12 and a crossbar 13 that is located above and substantially parallel to the footrests 12. The large wheels 50 are mounted to two sides of the main chassis 10 and front and rear wheels 51, 52 are respectively mounted to the front and rear chassis 20, 30. The reclining back frame 40 forms at least one elongated driving slot 41 and the handles 42. The front side of the main chassis 10 is provided, at an upper portion thereof, with extendable bars 60, which are arranged in an inclined manner, and the support arms 61. The main chassis 10 is further provided, at opposite sides thereof, with the side guard boards 70, 71. Further, upholsteries 16, 43 are provided at suitable locations on the main chassis 10, the front chassis 20, and the reclining back frame 40. As such, a multi-purpose wheelchair is realized.

Figure 3:
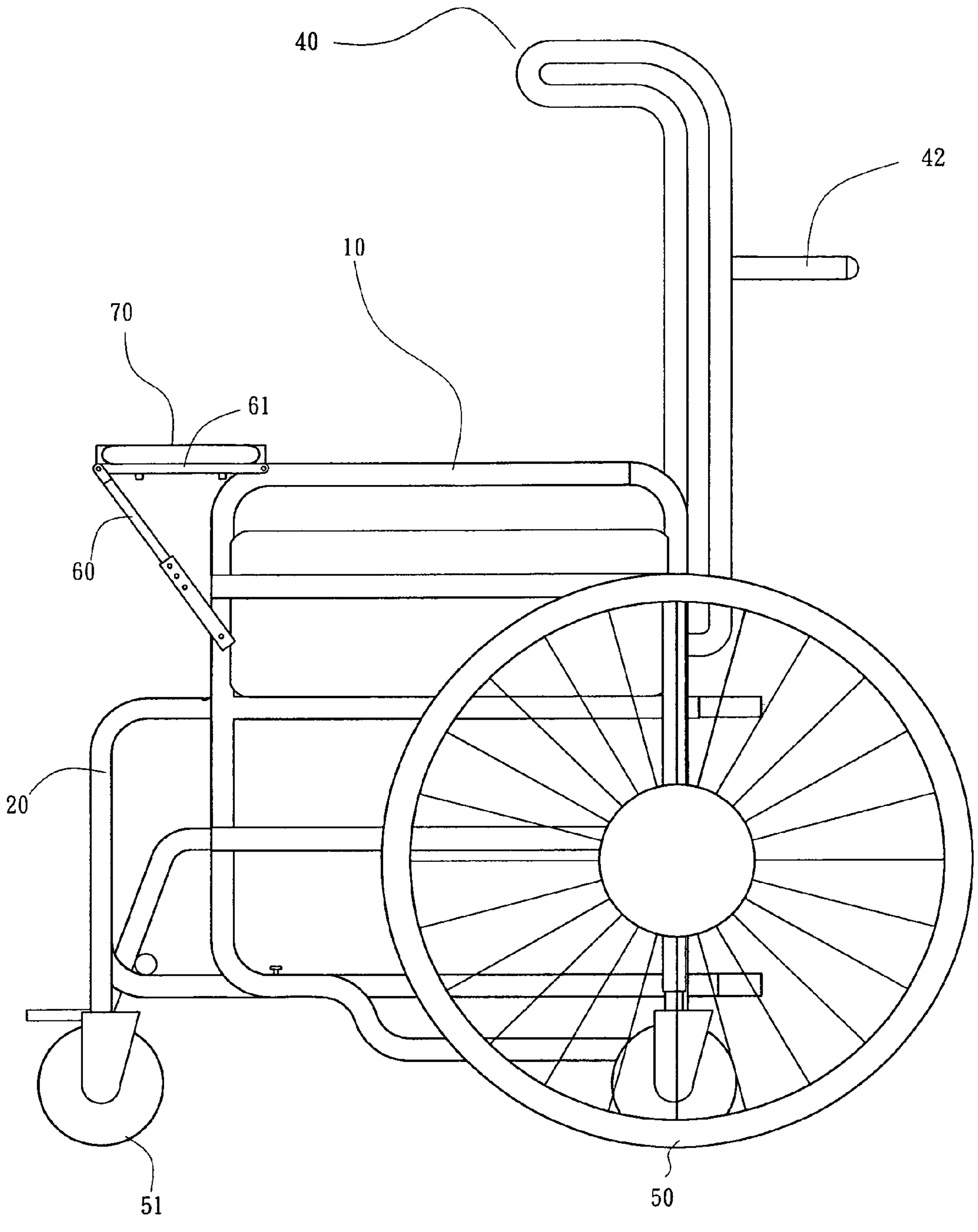
FIG. 3 is a side elevational view of the wheelchair of the present invention.
Figure 4:
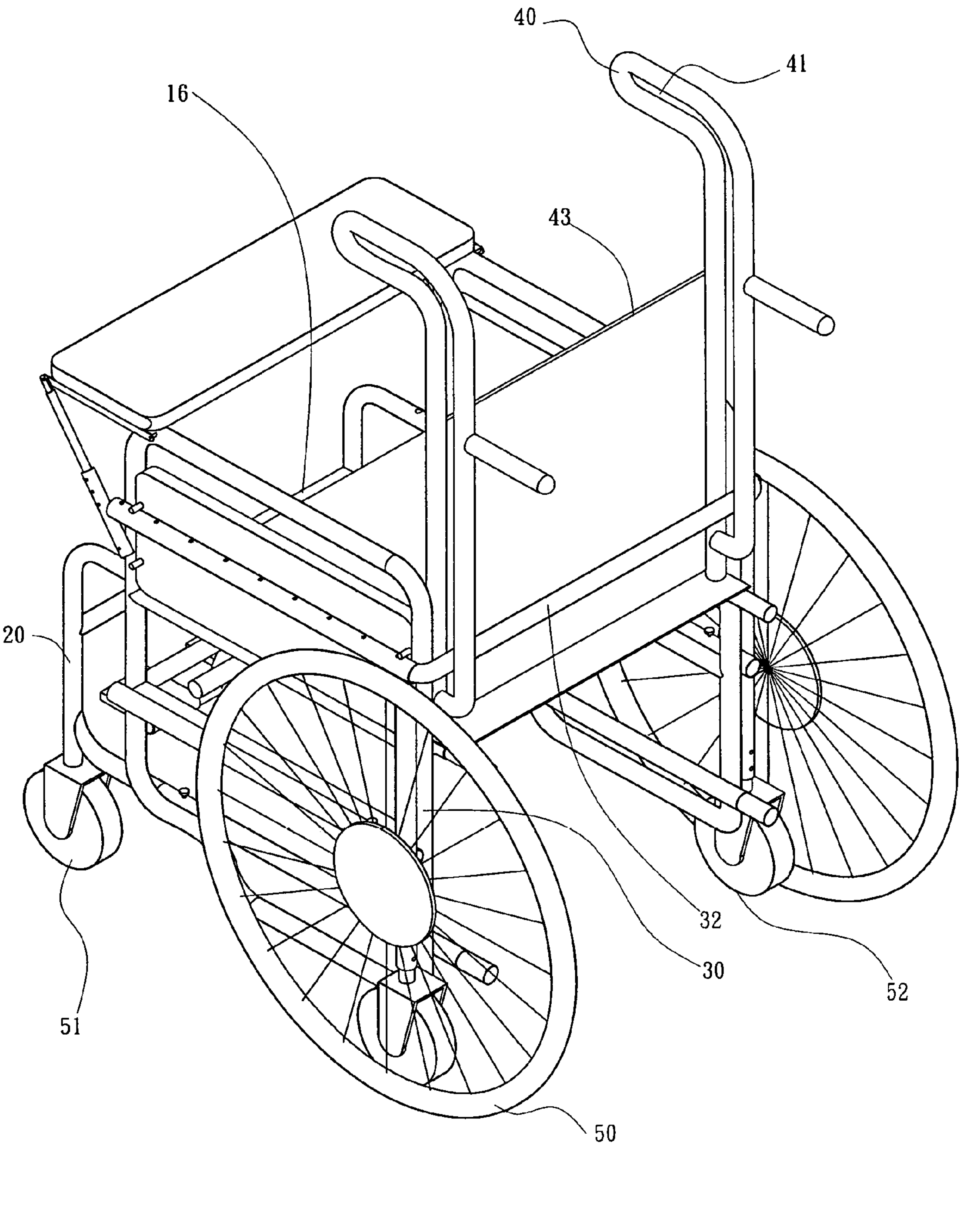
FIG. 4 is another perspective view of the wheelchair of the present invention.
Figure 5:
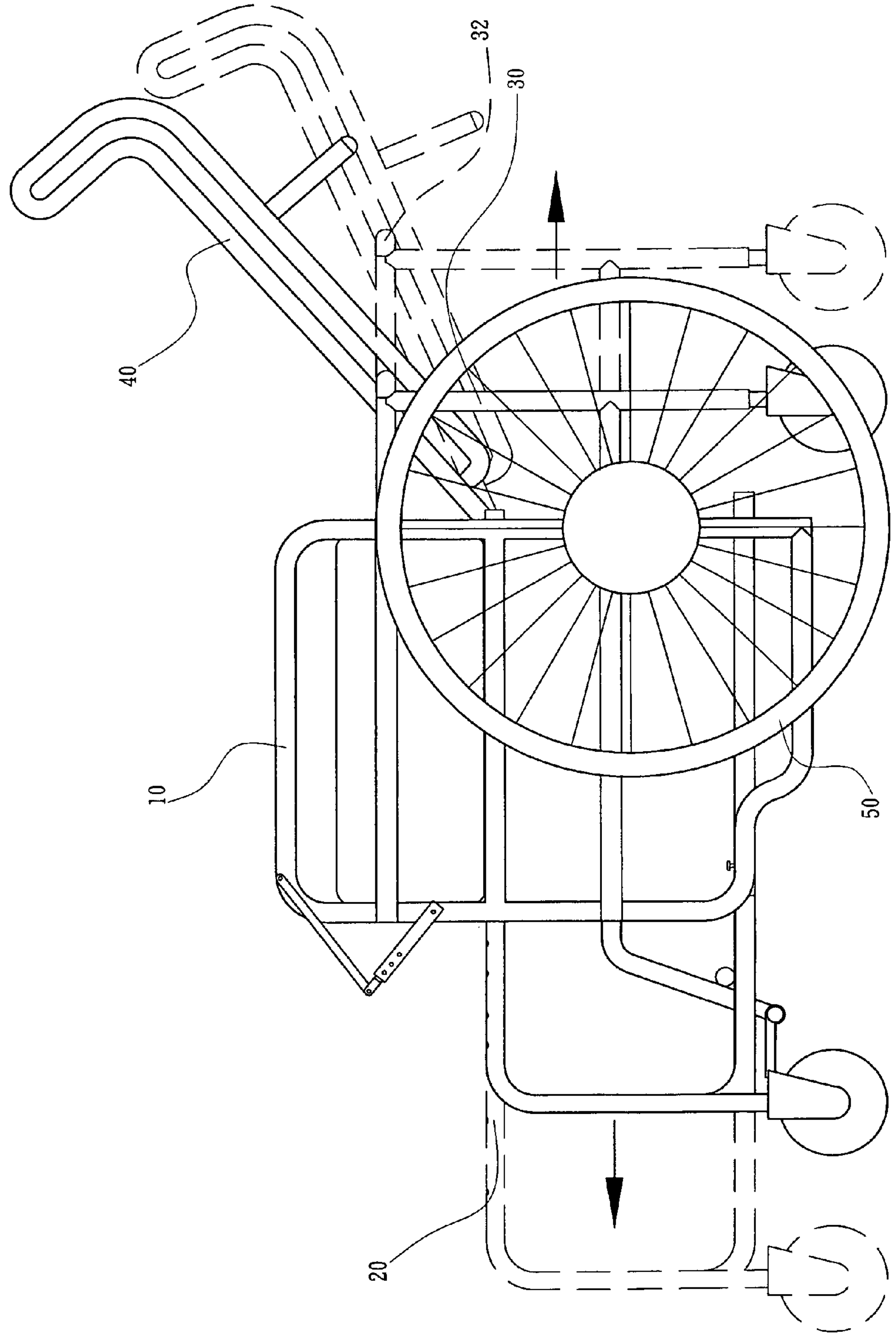
FIG. 5 is a side elevational view illustrating conversion of the wheelchair of the present invention into a push-cot.

Also referring to FIGS. 3-11, which demonstrate the operation of the wheelchair in accordance with the above described embodiment of the present invention. The structure provided by the present invention can be, in a normal use condition, set in the form of a wheelchair, which is provided with two side guard boards 70, 71 on the opposite sides of the main chassis 10, as shown in FIG. 1, for the protection of a user of the wheelchair. The main chassis 10 is also provided, at the upper portion of the front side thereof, with the extendible bars 60 that are arranged in an inclined manner, and the support arms 61. By operating the extendible bars 60 to raise the support arms 61 to a raised horizontal position and by further removing the side guard board 70 from the main chassis 10 and positioning the guard board 70 on the support arms 61, a practical platform for positioning thereon an object is formed, as shown in FIG. 3, which allows the wheelchair user to carry out activities including dinning, drinking, reading, and writing. The main chassis 10 is provided with handles 42 mounted to the reclining back frame 40 that is arranged at the rear side of the main chassis 10 to allow a companion or a nurse to move the wheelchair. Or alternatively, the user may simply operate the large wheels 50 to advance or move backward.

Further, the reclining back frame 40 is rotatably mounted to the rear side of the main chassis 10 and forms the driving slots 41. When the wheelchair user feels uncomfortable, for example having sit on the wheelchair for a long time, can change his or her posture from sitting to reclining by extending the rear chassis 30, by which the driving bar 32 causes, by way of the forcible engagement thereof with the driving slots 41 of the reclining back frame 40, the reclining back frame 40 to be set a desired inclination angle. Further, the front chassis 20 may also be extended frontward to provide a comfortable support to the wheelchair user's legs for further relaxing the user and removing the discomfort of long-term sitting on the wheelchair. It is noted that when the front and rear chassis 20, 30 are extended respectively in the frontward and rearward directions, the front wheels 51 and the rear wheels 52 are moved away from the large wheels 50 to ensure a more stable support to the user reclining on the wheelchair.

Referring to FIGS. 5-8, when the user needs to completely lie down, the front and rear chassis 20, 30 are extended to the front and rear limits respectively. Under this condition, the movement of the rear chassis 30 to the rear limit position causes the driving bar 32 to drive, through the driving slots 41, the reclining back frame 40 to a substantially horizontal position in which the upholsteries 16, 43 of the main chassis 10, the front chassis 20, and the reclining back frame 40 form a continues and flat plane on which the user can lie. With the large wheels 50, the front and rear wheels 51, 52, the structure of the present invention is converted from a wheelchair to a movable push-cot, which may support a user to rest thereon and may also be selectively used as a regular bed on which a person may sleep or lie.

The upper-side extension tubes 31 of the rear chassis 30 and the corresponding rear fitting tubes 15 of the main chassis 10 are arranged in such a way that when the structure of the present invention is set in the form of push-cot, the upper-side extension tubes 31 and the corresponding rear fitting tubes 15 are located above the upholsteries 16, 43. Thus, the upper-side extension tubes 31 and the corresponding rear fitting tubes 15 may serve as side rails that protect a patient from falling off the push-cot.

Further, the structure provided by the present invention allows a wheelchair to be efficiently converted into a push-cot and the posture of a patient can be changed from sitting to lying without being moving off the structure. This allows efficient performance of emergent medical treatment, such as CPR, on the patient who was originally sitting on the wheelchair.

It is noted that to ensure the frontward extension and the rearward extension of the front chassis 20 and the rear chassis 30 to be done in an efficient and well-controlled manner, while providing sufficient supporting, the main chassis 10 is provided with the front and rear fitting tubes 14, 15, which are formed with axially-spaced locking holes 17 (see FIG. 9), and correspondingly, the upper-side extension tubes 21 of the front chassis 20 and the upper-side extension tubes 31 of the rear chassis 30 are each provided therein with a resilient element 80 that supports and biases a locking pin 81. Thus, with the telescopic engagement between the upper-side extension tubes 21, 31 and the corresponding fitting tubes 14, 15, the relative position therebetween can be set in an adjustable manner and releasably secured by having each locking pin 81 engaging a selected one of the locking hole 17. In addition, to prevent undesired relative movement between the main chassis 10 and the front and rear chassis 20, 30, a fastener 82 (see FIG. 10), such as a bolt, is provided on each fitting tube 14, 15 corresponding to the lower-side extension tubes 211, 311 of the front and rear chassis 20, 30 whereby by rotating the bolts 82 to tighten against the lower-side extension tubes 211, 311, the relative movement between the main chassis 10 and the front and rear chassis 20, 30 is prevented.

Figure 11:
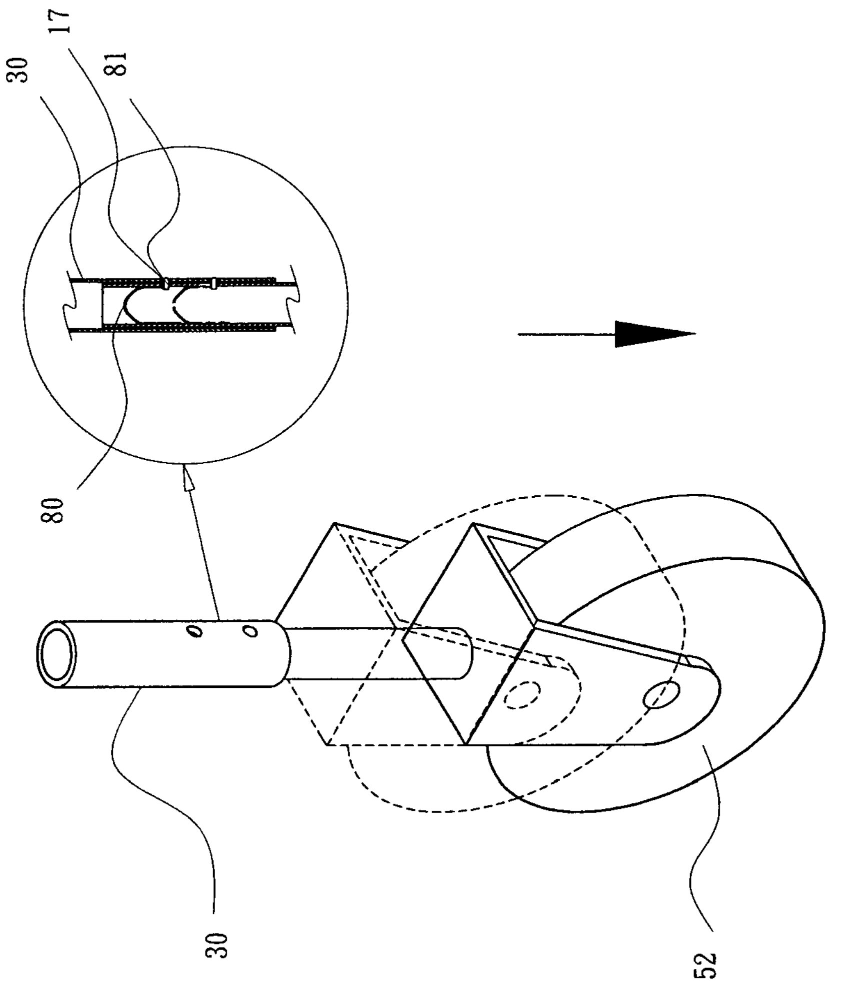
FIG. 11 is a perspective view illustrating height adjustability of a rear wheel with respect to a rear chassis of the wheelchair of the present invention.

Further, the releasable locking mechanism comprised of the locking pin 81 that is resiliently biased by the resilient element 80 and the locking hole 17 can be applied to either one or both of the front and rear wheels 51, 52. FIG. 11 shows an example in which the locking mechanism is applied to the rear wheel 52 to provide the rear wheel 52 with height adjustability, wherein the rear wheel 52 is mounted to an inner tube that is telescopically fit into an outer tube that constitutes in part the rear chassis 30. The locking pin 81 and the resilient element 80 are received in the inner tube to selectively engage one of a plurality of locking holes 17 defined in the outer tube.

Further, if desired, accessories, such a storage box or a receptacle, can be provided in a lower portion of for example the rear chassis 30 or on a back side of the reclining back frame 40.

Further, if desired, the hanger bracket 11 and the footrests 12 can be provided with the same locking mechanism therebetween to provide location adjustability of the footrests to accommodate different length of legs of different users. The footrests 12 can be made foldable, if desired, to be selectively set in a stowed condition in order to eliminate potential damage caused by undesired interference with the limbs of the user.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wheelchair comprising:

a main chassis on which at least one upholstery is provided, the main chassis comprising front fitting tubes and rear fitting tubes, two large wheels being rotatably mounted to two lateral sides of the main chassis;

a front chassis arranged at a front side of the main chassis and comprising upper-side and lower-side front extension tubes telescopically and movably fit to the front fitting tubes of the main chassis so as to provide an adjustable relative position of the front chassis with respect to the main chassis to allow the relative position of the front chassis to change from a most-retracted position where the front chassis is substantially received in the main chassis to a most-extended position, and front wheels being rotatably mounted to the front chassis;

a reclining back frame rotatably mounted to a rear side of the main chassis to provide an adjustable inclination of the reclining back frame, the reclining back frame forming at least one driving slot, which is in the form of an L-shape;

a rear chassis arranged at a rear side of the main chassis and comprising upper-side and lower-side rear extension tubes telescopically and movably fit to the rear fitting tubes of the main chassis so as to provide an adjustable relative position of the rear chassis with respect to the main chassis to allow the relative position of the rear chassis to change from a most-retracted position where the rear chassis is substantially received in the main chassis to a most-extended position, the rear chassis comprising a driving bar that is movably received in and in driving engagement with the driving slot of the reclining back frame so that when the relative position of the rear chassis is adjusted with respect to the main chassis to the most-extended position, the inclination of the reclining back frame is adjusted correspondingly and set to a substantially horizontal condition, and rear wheels being rotatably mounted to the rear chassis; and guard boards, which are removably mounted to the lateral sides of the main chassis below armrests of the main chassis;

wherein the relative positions of the front and rear chassis are changeable from the most-retracted position, where the front and rear chassis are substantially received in the main chassis to allow the wheelchair to operate as a wheelchair, to the most-extended position, where the reclining back frame is substantially horizontal to allow the wheelchair to be converted to a push-cot, in which the guard boards are re-positionable on the front chassis to support legs of a user lying on the push-cot.

2. The wheelchair as claimed in claim 1, wherein the main chassis comprises a hanger bracket projecting outward from the front side of the main chassis to carry thereon footrests and a crossbar located above and substantially parallel to the footrests.

3. The wheelchair as claimed in claim 1, wherein the front chassis is releasably secured to the main chassis by first locking means, which comprises a locking pin biased by a resilient element received in at least one of the upper-side front extension tubes and selectively engageable with one of a plurality of spaced locking holes defined in the corresponding front fitting tube of the main chassis, and second locking means, which comprises a fastener mounted to at least one of the front fitting tubes of the main chassis and engageable with a corresponding one of the lower-side front extension tubes of front chassis.

4. The wheelchair as claimed in claim 1, wherein the rear chassis is releasably secured to the main chassis by first locking means, which comprises a locking pin biased by a resilient element received in at least one of the upper-side rear extension tubes and selectively engageable with one of a plurality of spaced locking holes defined in the corresponding rear fitting tube of the main chassis, and second locking means, which comprises a fastener mounted to at least one of the rear fitting tubes of the main chassis and engageable with a corresponding one of the lower-side rear extension tubes of the front chassis.

5. The wheelchair as claimed in claim 1, wherein the guard board is provided with pegs that are removably and selectively fit into holes defined in the upper-side front extension tubes of the front chassis for re-positioning the guard boards to support the legs of the user.

6. The wheelchair as claimed in claim 1, wherein an extendible bar is mounted to each lateral side of the main chassis and carrying a support arm, the extendible bar being extendible to set the support arm in a horizontal condition for supporting thereon a board serving as a platform.

7. The wheelchair as claimed in claim 1, wherein the upper-side rear extension tubes of the rear chassis and the corresponding rear fitting tubes of the main chassis are located above the upholstery of the main chassis when the reclining back frame is set in the horizontal condition to convert the wheelchair to a push-cot in order to serve as side rails of the push-cot.

8. The wheelchair as claimed in claim 1, wherein each of the rear wheels and the rear chassis are provided therebetween with a releasable locking mechanism comprised of a locking pin biased by a resilient element and engageable with one of a plurality of spaced locking holes to provide location adjustability of the rear wheel.

9. The wheelchair as claimed in claim 2, wherein the footrests are foldable with respect to the hanger bracket.

10. The wheelchair as claimed in claim 2, wherein a releasable locking mechanism comprising a locking pin biased by a resilient element and engageable with one of a plurality of spaced locking holes is arranged between the footrests and the hanger bracket to provide location adjustability of the footrests.

* * * * *